United States Patent
Nurmi

[11] Patent Number: 5,991,386
[45] Date of Patent: Nov. 23, 1999

[54] METHOD AND ARRANGEMENT FOR THE CONNECTION OF MULTIPLE TERMINALS TO ONE SUBSCRIBER LINE OF THE TELEPHONE NETWORK, AND A TERMINAL

[75] Inventor: Veikko Nurmi, Turku, Finland

[73] Assignee: Nokia Technology GmbH, Pforzheim, Germany

[21] Appl. No.: 08/816,276

[22] Filed: Mar. 13, 1997

[30] Foreign Application Priority Data

Mar. 13, 1996 [FI] Finland ..................................... 961165

[51] Int. Cl.$^6$ ........................... H04M 3/42; H04M 11/00; H04M 9/02; H04M 1/00
[52] U.S. Cl. ...................... 379/208; 379/93.35; 379/168; 379/184; 379/377; 379/378
[58] Field of Search ..................................... 379/168, 184, 379/208, 377, 378, 442, 93.28, 93.34, 93.35, 215

[56] References Cited

U.S. PATENT DOCUMENTS

| | | | |
|---|---|---|---|
| 4,852,151 | 7/1989 | Dittakavi et al. | 379/215 X |
| 4,995,074 | 2/1991 | Goldman et al. | 379/215 X |
| 5,140,631 | 8/1992 | Stahl | 379/377 |
| 5,519,767 | 5/1996 | O'Horo et al. | 379/215 |

*Primary Examiner*—Harry S. Hong
*Attorney, Agent, or Firm*—Ware, Fressola, Van Der Sluys & Adolphson LLP

[57] ABSTRACT

In an arrangement for the connection of two or more terminals (1, 1') to one subscriber line (3) the terminals (1, 1') are connected to a chain so that the connection from the subscriber line (3) to a terminal (1) is further branched (13) to the next terminal (1'), and the arrangement according to the invention is characterized in that it comprises means (18, 20) to detect whether the terminal (1) and the next terminal (1') are in the operating state or in the idle state; a controllable switch (12, 14) for each terminal (1, 1') connected to the subscriber line (3) in order to connect the corresponding terminal (1, 1') to the subscriber line (3) and disconnect it from the line; and means (18, 20) to independently control the switch (12, 14) corresponding to each terminal (1, 1') depending on which states are detected for the terminals (1, 1'). Thus it is possible, when required, to cut off the current from the subscriber line (3) in order to disconnect the connection. In order to detect the operating state of the next terminal (1') it is preferable to provide the connection (13) to it with a current meter or detector (20). With the invention one is always able to use a second terminal (1') when desired, e.g. a telephone, which is connected behind a first terminal (1), e.g. a modem. The second terminal (1') will not require any special design and it must not necessarily be able to be connected in a chain.

7 Claims, 2 Drawing Sheets

METHOD AND ARRANGEMENT FOR THE CONNECTION OF MULTIPLE TERMINALS TO ONE SUBSCRIBER LINE OF THE TELEPHONE NETWORK, AND A TERMINAL

TECHNICAL FIELD

The invention relates to a method and an arrangement for the connection of multiple terminals to one subscriber line of the telephone network. The invention also relates to a terminal embodying the arrangement of the invention.

BACKGROUND OF THE INVENTION

A terminal here means any device which is intended to be electrically connected to a subscriber line of the telephone network and to be used to communicate information through the telephone network. E.g. a telephone, a modem, a telefax termninal, an answering machine.

A subscriber line of the telephone network here means that part (the telephone line) of the telephone network, which a telephone company or other corporation maintaining the telephone network supplies to a customer for the terminal. Physically the subscriber line normally comprises one conductor pair. To the customer the subscriber line usually "appears" as a telephone socket, to which he connects the terminal in question.

An exchange here means that part of the telephone network, which in a convenient way performs the switching between different subscriber lines in order to communicate information. The exchange can be an exchange covering e.g. a city or another large geographical area, or an internal exchange of a company or a building.

When a terminal connected to the subscriber line is activated, it will first supply the required information (the telephone number), with the aid of which the exchange connects the terminal in question to another terminal, and when the terminal terminates its activity (changes into a non-active state), the exchange disconnects the connection, i.e. it separates the terminals from each other.

The electrical characteristics of the subscriber line are such that normally a plurality of terminals can be simultaneously connected to the same subscriber line. This is due to the fact that the terminal receives current (typically 10 to 100 mA) from the subscriber line only when it is operating (active). With the aid of this current the exchange recognizes that the terminal in question is in use. When the terminal ends it activity it will cut off the line current, whereby the exchange recognizes that the line is not used anymore, and then disconnects the connection.

Of those terminals connected to a single subscriber line only one can be in operation (active) at a time. If two or more terminals are simultaneously active they will generally interfere with each other, or totally prevent appropriate operation. Different switching arrangements have been developed in order to eliminate this problem, but even they have their disadvantages. Below we discuss some known methods and problems related to their use.

A common solution is to connect the terminals in parallel to the subscriber line, without any special arrangements, and the user is responsible so that only one terminal is used at a time. This is the most common situation, at least in home applications.

One disadvantage is that the user control is not always sufficient, particularly if there are several users, or if there is a great distance between the terminals, or if some of the terminals (e.g. a modem) operate automatically.

In another common solution the terminals are connected to the subscriber line via a relay switch, which operates as follows: when there are no terminals in use all relays are closed, i.e. all terminals are connected to the subscriber line and any one of them can be used. When a terminal is activated and occupies the subscriber line in order to use it, then the relays of the other terminals will open, and then these devices can not operate as long as the first mentioned terminal is active. The relay switch is a separate device, which is directly controlled by the currents conducted by the telephone line and the terminals connected to the line. The terminals will not require any special design.

A disadvantage in the use of the relay switch is that it is not possible to observe the priorities of different terminals, if it for instance would be required that it is always possible to make a call with a telephone connected to the subscriber line, even if it would mean to interrupt the ongoing operation of another terminal during the call.

One solution is to provide the subscriber line with a multiple-way switch, through which only one terminal at a time is connected to the subscriber line. With the switch the user can select a desired terminal at any time; at the same time the use of the other terminals is prevented or interrupted.

A disadvantage is that when the user uses different terminals he must always remember to change the position of the multiple-way switch. This may constitute a substantial inconvenience if there is a great distance between the terminals and between the terminals and the multiple-way switch.

Such solutions are also known in which the terminals form a chain, and each terminal has a connection both for the telephone line and for another terminal. In the prior art solution shown in FIG. 1 the first terminal 1 is connected to the telephone socket (the subscriber line 3) in the usual way, and the second terminal 1' is connected to the connection 8 provided for this in the first terminal, and so on. Then each terminal 1, 1' contains an internal two-way switch or relay 5, 5', which, when the terminal in question is activated, disconnects from the subscriber line those terminals, which are farther behind and connected to the terminal in question. For this purpose the device contains detection and control means 4, 4' which control the switch 5, 5'. The order in the chain will simultaneously determine the priority of the devices: the first device 1 is connected directly to the subscriber line 3 and is always available, and when required it can interrupt the operation of the other devices 1'.

A prior art arrangement shown in FIG. 2 is also known, which is able to partly change this order of importance. Then the device 1 will check before it is activated whether any "next" device connected to this terminal in question is operating, and if so, the terminal in question will wait until the operating device terminate its operation. This check is performed by measuring with the current measurement means 9 the current of the subscriber line 8 conveyed to the next terminal through the terminal 1 in question, and by controlling the detection and control means 4.

On the other hand, if the terminal 1 was already active, the "next" terminal is not able to interrupt its operation, but has to wait.

The disadvantage is that it is possible to connect to the chain only one such terminal which is not equipped with the auxiliary equipment required by the chaining. This device must be connected as the last one in the chain, whereby it is also the last one in the "order of importance". In practice this device is a common telephone, which regarding its use generally is desired to be the first in the order of importance, i.e. a device which always can be used, independently of the other devices.

Further, all known arrangements described above have one common disadvantage: if any terminal tries to activate itself when another one is active, and the latter then ends its operation and connects the first terminal to the telephone line, then the original connection will not be disconnected, because the line current continues to flow via the first terminal, and the exchange is not able to recognize that the connection should be disconnected before a new connection can be made. This can cause substantial inconvenience particularly regarding automatically operating terminals having a design which could not be prepared for such incorrect function.

SUMMARY OF THE INVENTION

In order to eliminate the above mentioned and other disadvantages a method for the connection of two or more terminals to one subscriber line is described, in which the terminals are connected in a chain so that the connection from the subscriber line to the terminal is further branched to the next terminal, and the terminals are controlled so as to be connected to and disconnected from the subscriber line, wherein it is observed whether the terminal and the next terminal are in an operating state on in an idle state, the connection of the terminal and the next terminal to the subscriber line and their disconnection from the line is controlled in accordance with their detected states, one terminal is given priority and the connection of any other terminal to the subscriber line is prevented or interrupted as a response to an operating state of the priority terminal, and as a response to said interruption, and correspondingly to the termination of said operating state, all terminals are disconnected from the subscriber line for a certain period before the priority terminal and correspondingly the second terminal are connected to the subscriber line.

The invention is also directed to an arrangement for the connection of two or more terminals to one subscriber line in which arrangement the terminals are connected in a chain so that the connection from the subscriber line to the terminal is further branched to the next terminal, and which arrangement contains at least one controllable switch in order to connect one or more terminals to the subscriber line and to disconnect them from the subscriber line, wherein it comprises means to detect whether the terminal and the next terminal are in the operating state or in the idle state, a controllable switch for each terminal connected to the subscriber line in order to connect the corresponding terminal to the subscriber line and disconnect it from the line, and means to independently control the switch corresponding to each terminal depending on which states are detected for the terminals.

Furthermore, the invention is directed to a terminal which can be connected to a subscriber line and in which the connection from the subscriber line is branched further to the next terminal, and which contains at least one controllable switch in order to connect terminals to the subscriber line and to disconnect them from the line, wherein it comprises means to detect whether the terminal and the next terminal are in the operating state or in the idle state, controllable switches in order to connect the terminal and correspondingly the next terminal connected to the subscriber line and to disconnect them from the line, means to independently control the switch corresponding to each terminal depending on which states are detected from the terminals, means to control the switch corresponding to the terminal to open and to stay open as a response to the fact that the next terminal from the terminal is in the operating state, and means to control the switch corresponding to the next terminal to open for a certain period as a response to the fact that the switch corresponding to the terminal is controlled to open, and to control both corresponding switches to open for a certain period as a response to the detection that said operating state of the next terminal has ended.

In the solution according to the invention it is essential that each terminal can be connected to the subscriber line through its own controllable switch, and that the switches can be controlled independently of each other, and that when required it is thus possible to switch off the current of the subscriber line in order to disconnect the connection. Further it is essential that the terminals are continuously observed whether they are in the operating state or in the idle state. In order to provide the observation it is preferable to detect or to measure whether a current is flowing in the connection between the terminal in question and the next terminal.

The following advantages are obtained with the method and the arrangement according to the invention. It is always possible to use a second terminal (e.g. a telephone) connected after a first terminal (e.g. a modem). The second terminal must not necessarily be specially designed or connectable to a chain. If the second terminal (telephone) is active, the first one (modem) will not be activated before the use of the telephone is terminated. If the modem is active when someone tries to use the telephone the modem will end its operation, takes care of the disconnection, and then allows a normal operation of the telephone.

BRIEF DESCRIPTION OF THE DRAWINGS

The invention and its different embodiments are described in more detail below with reference to the enclosed drawings, in which.

BEST MODE FOR CARRYING OUT THE INVENTION

Figure 1:
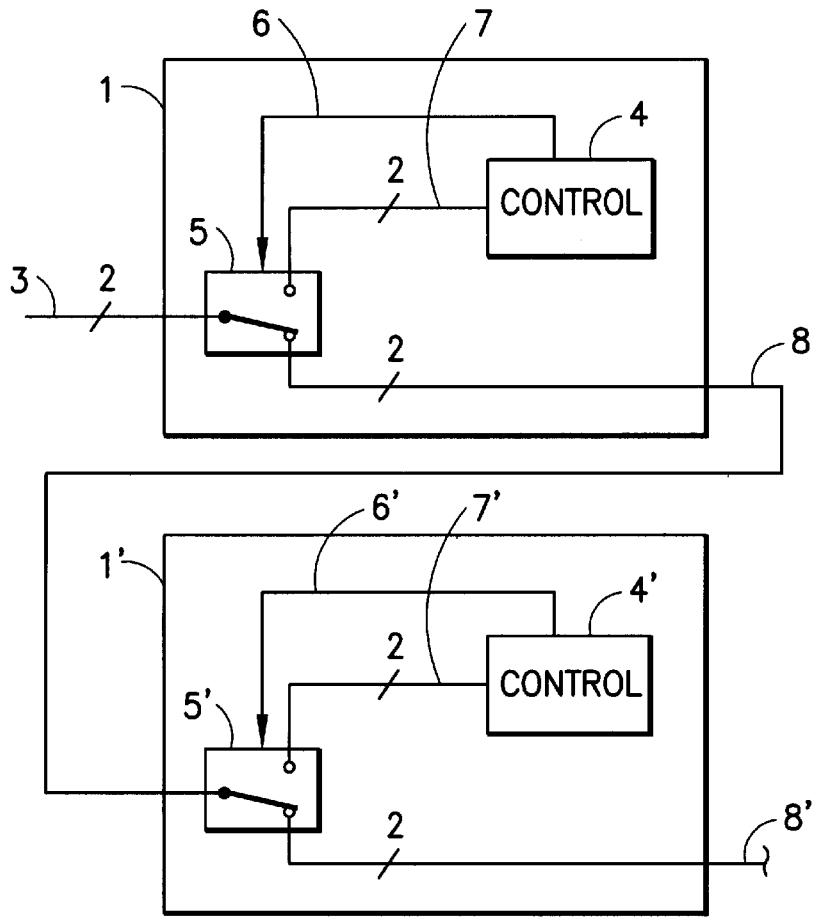
FIG. 1 shows a prior art arrangement for the connection of multiple terminals to one subscriber line.
Figure 2:
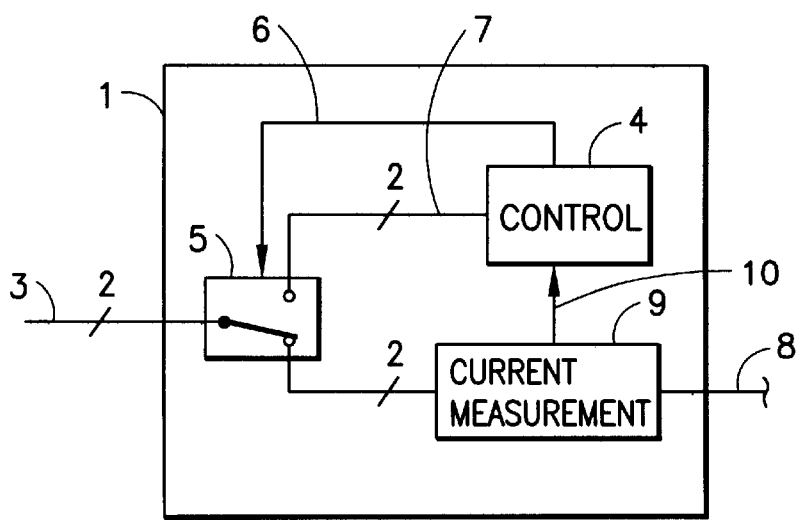
FIG. 2 shows another prior art arrangement for the connection of multiple terminals to one subscriber line.
Figure 3:
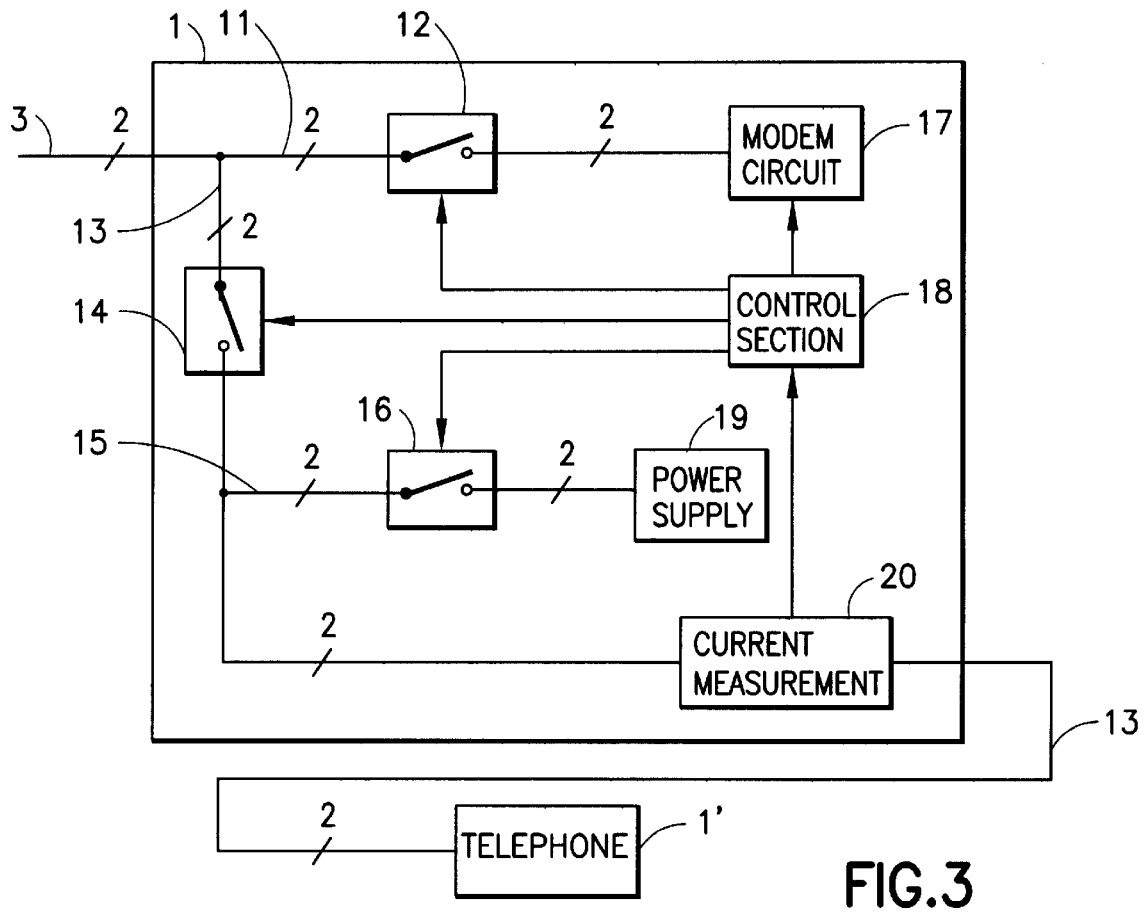
FIG. 3 shows in a block diagram an embodiment of the arrangement according to the invention.

The arrangement shown in FIG. 3 comprises the following sections:

a switch (relay or equivalent) 12, which connects the telephone line 3 to the modem circuit 17 in the first terminal 1, which in this example is a modem, a switch (relay or equivalent) 14, which connects the telephone line 3 to an external terminal 1' (in the example a telephone), a switch (relay or equivalent) 16, which connects the power supply 19 to the telephone 1', a current measurement device 20, which measures the current in the line 13 supplied to the telephone 1', a control section 18, which controls the operation of the other sections.

The arrangement of FIG. 3 operates in the following way. The switches 12 and 16 are open and the switch 14 is closed when the modem 1 is not active. The telephone line 3 is thus connected to the telephone 1', and the telephone can be used in the normal way. If there is an attempt to use the modem 1, the control section 18 first checks with the aid of the current meter 20 whether the telephone 1' is in use. If it is, then the modem 1 will not be connected to the line 3 but will wait until the telephone 1' is closed. The disconnection of the telephone is detected by the current meter 20.

When the telephone 1' is not in use and somebody begins to use the modem 1, then the control section 18 closes the switch 12, whereby the modem 1 is connected to the telephone line 3 in a normal way. At the same time the switch 14 is opened and the switch 16 is closed.

If there is an attempt to use the telephone 1' when the modem 1 is connected to the line 3, then the current from the power supply 19 begins to pass through the telephone 1'. The control section 18 detects this with the aid of the current meter 20. Then it interrupts the operation of the modem circuit 17 and opens the switch 12. Thereby the current of the telephone line 3 is cut off, whereby the exchange disconnects the connection. After a suitable delay (in practice about 1 second) the control section 18 opens the switch 16 and closes the switch 14, after which the telephone 1' operates in a normal way.

Figure 4:
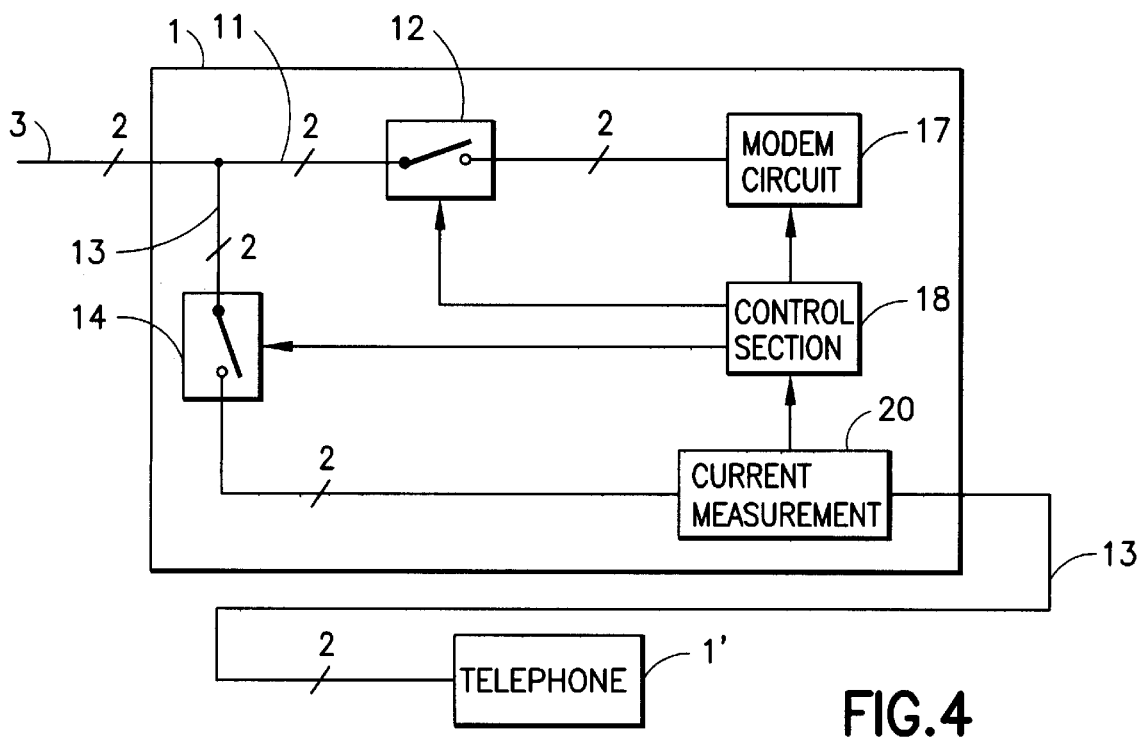
FIG. 4 shows in a block diagram another embodiment of the arrangement according to the invention.

FIG. 4 shows another embodiment which differs from the previous only in that the power supply 19 and the switch 16 are omitted in the solution shown in FIG. 3. The function differs from the above function only in the following way. When the telephone 1' is not in use, and somebody begins to use the modem 1, then the control section closes the switch 1, whereby the modem 1 (the modem circuit 17) is connected to the line 3 in a normal way. The switch 14 is also kept closed. If there is an attempt to use the telephone 1' when the modem 1 is connected to the line 3, the current from the telephone line 3 begins to also pass through the telephone 1'. The control section 18 detects this with the aid of the current meter 20. Then it interrupts the operation of the modem circuit 17 and opens the switches 12 and 14, whereby the current from the telephone line 3 is cut off and the exchange disconnects the connection. After a suitable delay (1 second) the control section closes the switch 14, after which the telephone 1' operates in a normal way.

Thus in the arrangement of FIG. 4 only the separate power supply 19 in figure is replaced by using the telephone line 3 as the power supply.

It is essential that both the modem circuit 17 and the telephone 1' are connected to the telephone line 3 by their own switches 12 and 14, which can be controlled independently, and thus the current of the telephone line 3 can be cut off when required in order to disconnect the connection, and that the current of the telephone 1' is observed both when the modem 1 (the modem circuit 17) is active and when the modem is not connected to the line 3.

In addition to the above presented features the presented circuit has the following advantage over a common and simple parallel coupling of terminals. If one of the terminals is activated and starts to transmit dialing pulses to the telephone line (a telephone or other terminal using pulse dialing), then the other terminals in a common parallel coupling can interpret these pulses as a ringing signal from the telephone line (for instance, a common telephone clinks when another parallel coupled terminal dials a telephone number). With the arrangement of FIG. 3 this disadvantage is obviated. It can be obviated also with the arrangement according to FIG. 4 if the switch 14 is opened during each pulse sequence. The pulse sequences are so short (the digit 0 one second, the other digits even shorter) that this will not greatly delay detection that there is an attempt to use the telephone.

In a preferred embodiment of the invention the first terminal 1 in the arrangement according to FIG. 4 is a modem (Nokia TM100), and there the switches 12 and 14 and the current meter 20 are realized by corresponding relays. The control section 18 is a microprocessor which controls the switch relays via corresponding transistors. The modem contains a conventional modem circuit as well as a pulse dial circuit and a call answer circuit. The telephone line and the next terminal to be connected in a chain (usually a telephone) are connected to the corresponding pins of the same connector with six pins.

If the telephone is used when the modem is in the idle state, then its current will pass through the current measurement relay which then operates and directs to the microprocessor the information that the telephone is in use. Then the modem will not attempt a connection to the telephone line. If the telephone is not used and the modem is activated, then the corresponding switch relay connects the modem circuit to the telephone line. The telephone also remains connected to the line, except if the modem uses pulse dialing to create the connection, whereby the switch 14 and the corresponding relay closes and disconnects the telephone from the telephone line and instead connects the pulse dialing circuit to the line. Thus the dialing pulses will not cause any incorrect functions in the other chained terminals. When the pulse dialing is completed, the same switch relay opens and connects the telephone again to the line. Thereafter the modem operates normally, if there is no attempt to use the telephone. If there is an attempt to use the telephone, the current measurement relay detects the current caused by this, the microprocessor disconnects the modem circuit from the telephone line and disconnects the telephone from the line during about 1 second with the aid of a corresponding relay. During this period the pulse dialing circuit is kept in a non-conducting state. Then the current in the telephone line is cut off and the connection is disconnected. A normal use of the telephone is enabled when the relay after about 1 second connects the telephone back to the telephone line.

Above we described some embodiments of the invention to which the invention naturally is not limited. For instance, it is obvious to a person skilled in the art that the method and the arrangement according to the invention can be also realized when more than two terminals are connected to the same subscriber line.

The invention may be varied within the scope of the enclosed claims.

I claim:

1. A method for the connection of a first terminal (1) in a local terminal system and least one next terminal (1') to one subscriber line (3), in which method:

the terminals (1, 1') are connected in a chain so that the connection from the subscriber line to the first terminal (1) is further branched to the at least one next terminal (1'), and the terminals (1, 1') are controlled so as to be connected to and disconnected from the subscriber line, characterized in that it is observed whether the first terminal (1) and the at least one next terminal (1') are in an operating state or in an idle state, the connection of the first terminal (1) and the next terminal (1') to the subscriber line (3) and their disconnection from the subscriber line is controlled in accordance with their detected states, one terminal (1, 1') is given priority and the connection of any other terminal to the subscriber line (3) is disconnected in response to the priority terminal being in the operating state, if the priority terminal (1') is in the operating state, the connection of any non-priority terminal to the subscriber line (3) is prevented and as a response to said interruption, and following termination of said operating state, all terminals (1, 1') are disconnected from the subscriber line (3) for a certain period before the priority terminal and each other terminal is connected to the subscriber line.

2. An arrangement for the connection of a first terminal (1) and least one next terminal (1') in a local terminal system to one subscriber line (3)

in which arrangement the terminals (1, 1') are connected in a chain so that the connection from the subscriber line to the first terminal (1) is further branched (13) to the next terminal (1'), and which arrangement contains at least one controllable switch in order to connect at least one next terminal (1') to the subscriber line (3) and to disconnect them from the subscriber line, characterized in that it comprises:

means (18, 20) to detect whether the first terminal (1) and the at least one next terminal (1') are in the operating state or in the idle state, a controllable switch (12, 14) for each terminal (1, 1') connected to the subscriber line (3) in order to connect the first terminal (1) or the at least one next terminal (1') to the subscriber line (3) and disconnect it from the line, and means (18, 20) to independently control the switch (12, 14) corresponding to each terminal (1,1') depending on which states are detected for the terminals (1, 1') so that the next terminal (1') is connected to, and the terminal (1) is disconnected from, the subscriber line (3) whenever the next terminal (1') is detected to be in the operating state.

3. An arrangement according to claim 2, characterized in that the detecting means contain means (20) to measure or to detect the current in the connection (13) branched further to the next terminal (1').

4. A first terminal in a local terminal system (1) which can be connected to a subscriber line (3) and in which the connection from the subscriber line (3) is branched (13) further to an at least one next terminal (1') in the local network system, and which contains at least one controllable switch in order to connect terminals (1, 1') to the subscriber line (3) and to disconnect them from the line, characterized in that it comprises:

means (18, 20) to detect whether the first terminal (1) and the at least one next terminal (1') are in the operating state or in the idle state, controllable switches (12, 14) in order to connect the first terminal (1) and correspondingly the next terminal (1, 1') connected to the subscriber line (3) and to disconnect them from the line, means (18, 20) to independently control the switch (12, 14) corresponding to each terminal (1, 1') depending on which states are detected from the terminals (1, 1'), means (18, 20) to control the switch (12) corresponding to the terminal (1) to automatically open and to stay open as a response to the fact that the next terminal (1') from the terminal (1) is in the operating state, and means (18, 20) to control the switch (14) corresponding to the next terminal (1') to open for a certain period as a response to the fact that the switch (12) corresponding to the terminal (1) is controlled to open, and to control both corresponding switches (12, 14) to open for a certain period as a response to the detection that said operating state of the next terminal (1') has ended.

5. A terminal according to claim 4, characterized in that the detection means contain means (20) to measure or to detect the current in the connection (13) branched further to the next terminal (1').

6. A terminal according to claim 5, characterized in that it is a modem.

7. A terminal according to claim 4, characterized in that it is a modem.

\* \* \* \* \*